(12) United States Patent
Shin et al.

(10) Patent No.: US 11,307,909 B2
(45) Date of Patent: Apr. 19, 2022

(54) SYSTEM FOR SLOWDOWN STATUS NOTIFICATION AND OPERATING METHOD THEREOF

(71) Applicant: SK hynix Inc., Gyeonggi-do (KR)

(72) Inventors: Seong Won Shin, San Jose, CA (US); Kyoungsun Hong, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/113,740

(22) Filed: Aug. 27, 2018

(65) Prior Publication Data

US 2019/0065289 A1  Feb. 28, 2019

Related U.S. Application Data

(60) Provisional application No. 62/551,584, filed on Aug. 29, 2017.

(51) Int. Cl.
*G06F 9/54* (2006.01)
*G06F 9/50* (2006.01)
*G06F 12/02* (2006.01)

(52) U.S. Cl.
CPC ............ *G06F 9/542* (2013.01); *G06F 9/5011* (2013.01); *G06F 9/5016* (2013.01); *G06F 12/0253* (2013.01); *G06F 2212/702* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 7,031,928 B1* | 4/2006 | Cochran | G06F 3/061 705/7.11 |
| 8,751,546 B1* | 6/2014 | Grieve | G06F 9/4843 707/813 |
| 2005/0108444 A1* | 5/2005 | Flauaus | H04L 41/0853 710/15 |
| 2005/0283477 A1* | 12/2005 | Donovan | G06F 9/542 |
| 2012/0124345 A1* | 5/2012 | Denman | G06F 9/3844 712/237 |
| 2012/0222005 A1* | 8/2012 | Harris | G06F 9/45504 717/120 |
| 2014/0006691 A1* | 1/2014 | Haukness | G11C 16/32 711/103 |
| 2015/0058650 A1* | 2/2015 | Varma | G06F 1/3293 713/324 |
| 2015/0268712 A1* | 9/2015 | Mouler | G06F 1/325 713/320 |
| 2017/0249091 A1* | 8/2017 | Hodes | G06F 3/0611 |
| 2017/0286205 A1* | 10/2017 | Jeong | G06F 3/0619 |

* cited by examiner

*Primary Examiner* — Chat C Do
*Assistant Examiner* — William C Wood
(74) *Attorney, Agent, or Firm* — IP & T Group LLP

(57) ABSTRACT

A data processing system includes a host device and a memory system including a controller and a memory device. The controller receives a command for the memory device from the host device, determines whether at least one slowdown event occurs due to an internal operation, and when it is determined that the slowdown event occurs, notifies the host device of occurrence of the slowdown event.

18 Claims, 7 Drawing Sheets

SYSTEM FOR SLOWDOWN STATUS NOTIFICATION AND OPERATING METHOD THEREOF

CROSS-REFERENCE TO RELATED APPLICATION(S)

This application claims the benefit of U.S. Provisional Application No. 62/551,584, filed on Aug. 29, 2017, the entire contents of which are incorporated herein by reference.

BACKGROUND

1. Field

Embodiments of the present disclosure relate to a data processing system including a memory system and an operating method thereof.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Various embodiments are directed to a system for notifying slowdown status of a memory system and an operating method thereof.

In accordance with an embodiment, a data processing system includes a host device and a memory system including a controller and a memory device. The controller receives a command for the memory device from the host device, determines whether at least one slowdown event occurs due to an internal operation, and when it is determined that the slowdown event occurs, notifies the host device of occurrence of the slowdown event.

In accordance with an embodiment, a method for operating a data processing system includes receiving a command for a memory device from a host device, determining whether at least one slowdown event occurs due to an internal operation, and notifying the host device of occurrence of the slowdown event when it is determined that the slowdown event occurs.

DETAILED DESCRIPTION

Figure 1A:
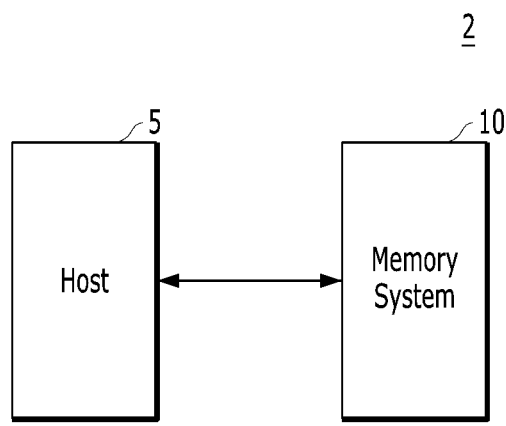
FIG. 1A is a block diagram illustrating a data processing system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like does not necessarily mean only one embodiment, and different references to any such phrases is not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example; the invention may be practiced according to the claims without some or all of these specific details. For clarity, technical material that is known in the technical fields related to the invention has not been described in detail so that the invention is not unnecessarily obscured.

FIG. 1A is a block diagram illustrating a data processing system 2 in accordance with an embodiment of the present invention.

Referring FIG. 1A, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 1B:
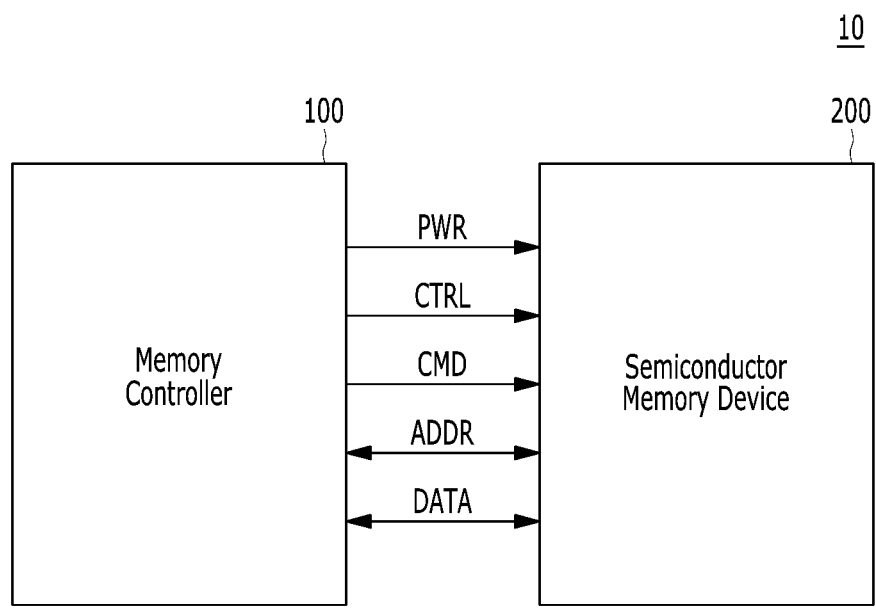
FIG. 1B is a block diagram illustrating a memory system in accordance with an embodiment of the present invention.

FIG. 1B is a block diagram illustrating a memory system 10 in accordance with an embodiment of the present invention.

Referring FIG. 1B, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, and so on.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
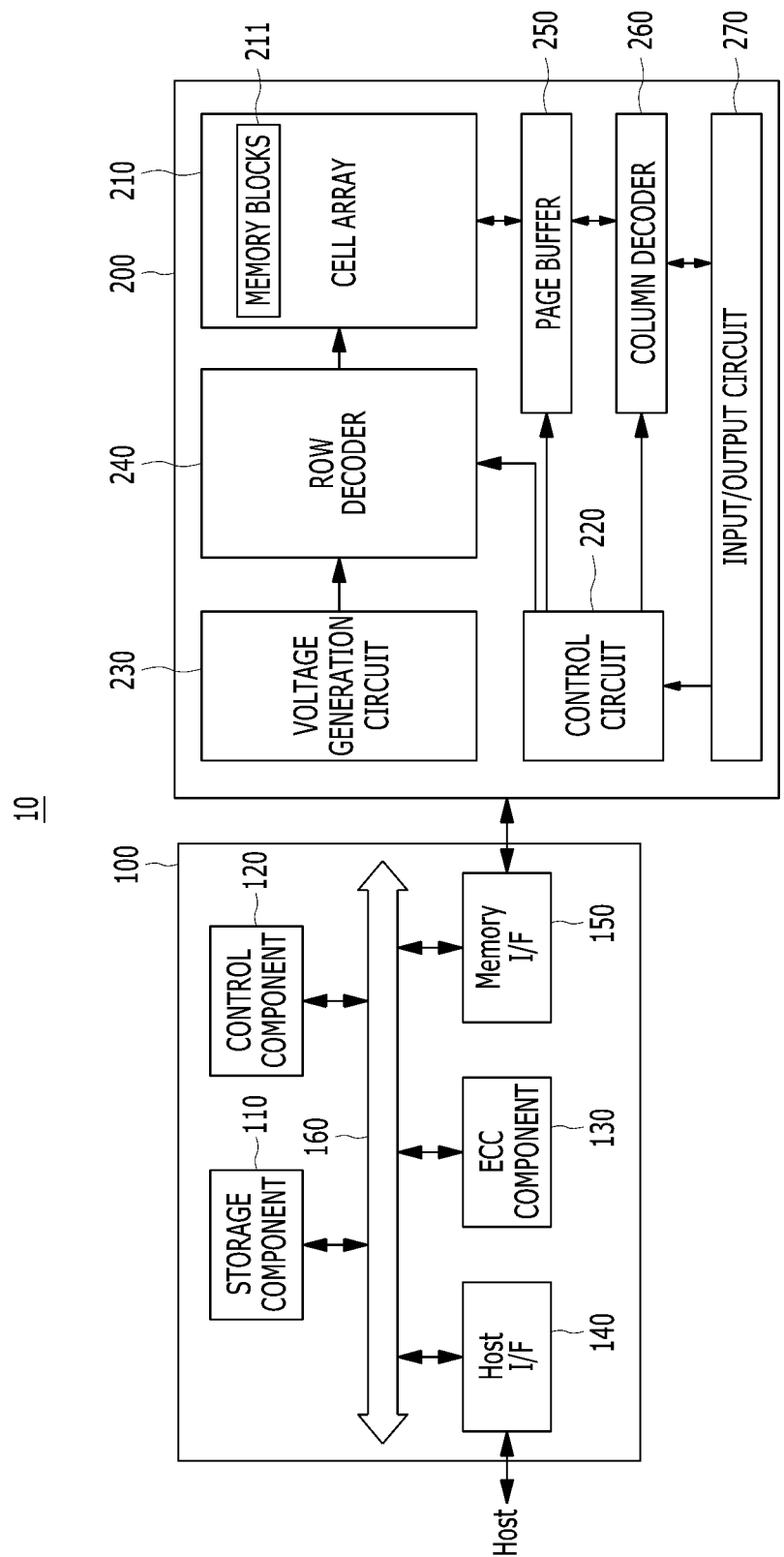
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIGS. 1A and 1B.

Referring to FIG. 2, the memory system 10 may include a memory controller 100 and a semiconductor memory device 200. The memory system 10 may operate in response to a request from a host device (e.g., host device 5 of FIGS. 1A and 1B), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage component 110, a control component 120, which may be implemented as a processor such as a central processing unit (CPU), an error correction code (ECC) component 130, a host interface (I/F) 140 and a memory interface (I/F) 150, which are coupled through a bus 160.

The storage component 110 may serve as a working memory of the memory system 10 and the controller 100, and store data for driving the memory system 10 and the controller 100. When the controller 100 controls operations of the memory device 200, the storage component 110 may store data used by the controller 100 and the memory device 200 for such operations as read, write, program and erase operations.

The storage component 110 may be implemented with a volatile memory such as a static random access memory (SRAM) or a dynamic random access memory (DRAM). As described above, the storage component 110 may store data used by the host device in the memory device 200 for the read and write operations. To store the data, the storage component 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
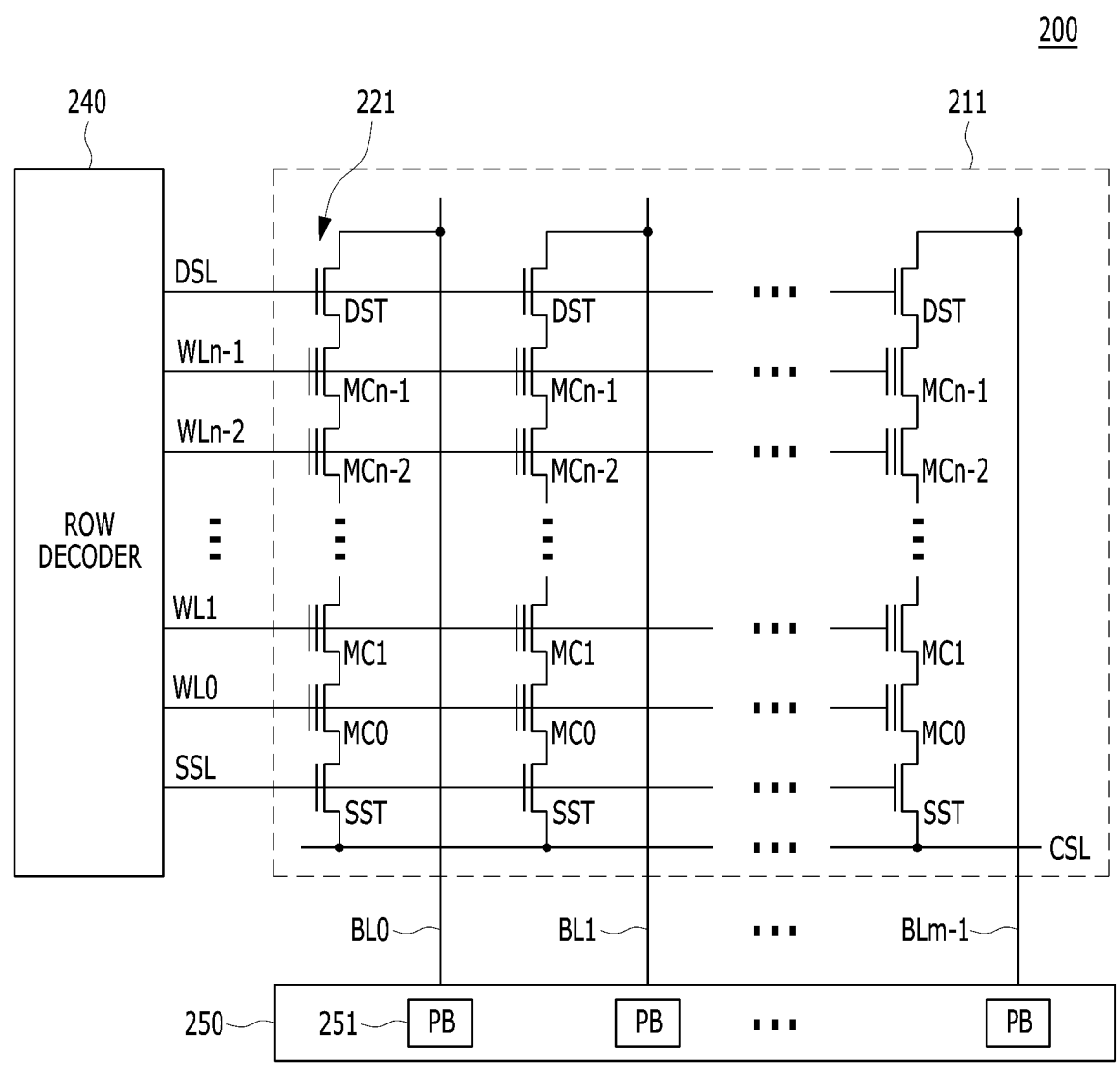
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1B), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

In various embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

The page buffer array 250 may include a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

Figure 4:
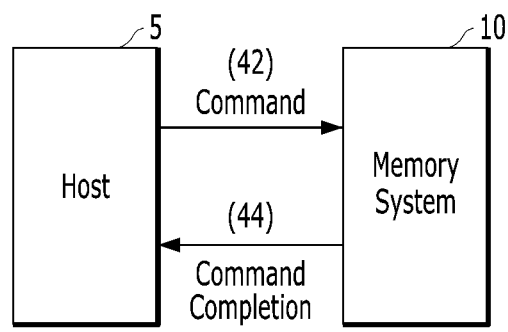
FIG. 4 is a diagram illustrating an operation for processing a command in a data processing system in accordance with an embodiment of the present invention.

FIG. 4 is a diagram illustrating an operation for processing a command in a data processing system 2 in accordance with an embodiment of the present invention.

Referring to FIG. 4, the data processing system 2 may include a host device 5 and a memory system 10. The host device 5 may issue (42) a command for any one operation such as a write operation, a read operation and an erase operation for a memory device included in the memory system 10. The memory system 10 may receive a command from the host device 5 and process the received command to perform a corresponding operation for the memory device. After performing the corresponding operation, the memory system 10 may transmit a command completion message to the host device 5. Thus, the host device 5 may receive (44) the command completion message from the memory system 10.

As described above, the host device 5 may issue a command for accessing the memory system 10 and acknowledge the completion of access in the memory system 10 through the command completion message. The command has a latency, e.g., a turnaround time, from command initiation by the host device 5 to command completion acknowledged by the host device 5. Commands of the host device 5 may experience exceptional latency time due to internal operations of the memory system 10. For example, when the memory system 10 is implemented with a solid state drive (SSD), the memory system 10 may perform internal operations including critical internal operations such as a garbage collection and a wear levelling due to the nature of a memory device (e.g. NAND media) included in the SSD. Such exceptional latency time may affect the quality of service between the host device 5 and the memory system 10, that is, the data processing system 2. In particular, during development or field failure analysis, such silent slowdowns of the SSDs may require significant effort in finding a root cause. Thus, in a data processing system including a host device and a memory system (or data storage device), a scheme may be required to voluntarily notify the host device of a slowdown status of the memory system due to its internal operations.

Figure 5:
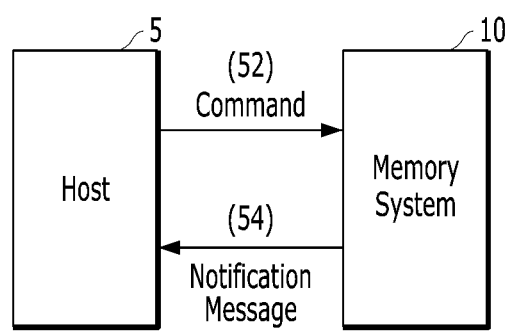
FIG. 5 is a diagram illustrating an operation for notifying a slowdown status of a memory system in a data processing system in accordance with an embodiment of the present invention.

FIG. 5 is a diagram illustrating an operation for notifying a slowdown status of a memory system in a data processing system in accordance with an embodiment of the present invention.

Referring to FIG. 5, the data processing system 2 may include a host device 5 and a memory system 10. The host device 5 may issue a command for any one operation such as a write operation, a read operation and an erase operation for a memory device included in the memory system 10. The memory system 10 may receive (52) a command from the host device 5 and process the received command to perform a corresponding operation for the memory device. When the command is received from the host device 5, the memory system 10 may perform an internal operation such as a garbage collection and a wear levelling. Due to the internal operation, the command may experience exceptional latency time. At this time, the memory system 10 may transmit (54) a notification message indicating slowdown status or slowdown of an event of the memory system 10 to the host device 5.

Figure 6:
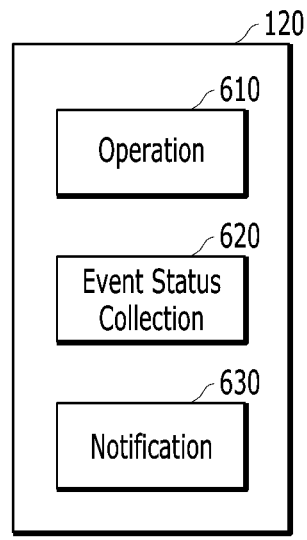
FIG. 6 is a diagram illustrating a control component of a memory controller in accordance with an embodiment of the present invention.

FIG. 6 is a diagram illustrating a control component of a memory controller in accordance with an embodiment of the present invention. The control component of FIG. 6 may correspond, but is not limited, to the control component 120 included in the memory controller 100 of the memory system 10 in FIG. 1B.

Referring to FIG. 6, the control component 120 may include an operation module 610, an event status collection module 620 and a notification module 630. In various embodiments, these elements 610, 620 and 630 may be implemented with firmware of the memory controller 110. As shown in FIG. 2, the control component 120 may be coupled to the host device 5 through the host interface 140 and may be coupled to the memory device 200 through the memory interface 150.

The operation module 610 may control performance of an operation corresponding to a command from the host device 5. For example, the operation module 610 may control the memory device 200 to perform any one among write, read, and erase operations for memory regions (e.g., blocks or pages) included in the memory device 200. Further, the operation module 610 may control the memory device to perform an internal operation (or background operation) such as a garbage collection and a wear levelling.

The event status collection module 620 may collect status of events relating to the internal operation of the memory controller 110. In various embodiments, the event status collection module 620 may define and register events relating to the internal operation of the memory controller 110. In particular, while performing the internal operation, the event status collection module 620 may collect and categorize slowdown events (or slowdown status) due to the internal operation of the memory controller 110. The event status collection module 620 may update internally statistics of events over a predetermined interval.

In various embodiments, an event may be related to a quality of service (QoS) between the host device 5 and the memory system 10. For example, the event may include a throughput throttling between the controller 100 and the memory device 200. For another example, the event may include a flow control between the host device 5 and the memory system 10.

The notification module 630 may determine whether a slowdown event has occurred or is occurring due to the internal operation. If it is determined that the slowdown event has occurred or is occurring, the notification module 630 may trigger a notification process to notify the host device 5 of the occurrence of the slowdown event. In various embodiments, the notification module 630 may determine whether a slowdown event occurs due to the internal operation by determining whether the slowdown event reaches a specified threshold level. When an event hits the corresponding threshold level, the notification module 630 may initiate a notification process to the host device 5.

When an event is related to throughput throttling, the notification module 630 may determine whether the slowdown event reaches the threshold level based on a resource allocation ratio (RT) of a housekeeping workload over a host workload over a predefined time interval as shown in List 1 below. The housekeeping workload corresponds to resource occupation for processing and/or executing housekeeping commands to maintain a particular quality of service during the internal operation. The host workload corresponds to resource occupation for processing and/or executing commands received from the host device.

In List 1, when the ratio $R_T$ is greater than a threshold value $R_{Tmin}$ (report_min) and is equal to or less than a threshold value $R_{Tmax}$ (report_max), the notification module 630 may transmit the notification message indicating slowdown event status corresponding to "Normal Warning". When the ratio $R_T$ is greater than a threshold value $R_{Tmax}$ (report_max), the notification module 630 may transmit the notification message indicating slowdown event status corresponding to "Critical Warning". The reporting period of slowdown event status, that is, the transmitting interval the notification message may be configurable ---
List 1

The ratio $R_T$ of the resource allocation ratio of the housekeeping
workload to the host workload over a predefined time interval
T (Throttle).
  $R_T$ = (Total resource occupation for Housekeeping
  commands)/(Total resource occupation for Host
  commands).
  $R_{Tmin}$ (report_min) and $R_{Tmax}$ (report_max) are runtime
  configurable parameters.
  If $R_T \leq R_{Tmin}$ (report_min), then no action.
  If $R_{Tmin}$ (report_min) < $R_T \leq R_{Tmax}$ (report_max), then
  start sending periodic Async Event Notification messages
  to the host device. The level is Normal Warning. The
  message reporting period interval is N × T(Throttle),
  where N >> 1, configurable.
  If $R_T$ > $R_{Tmax}$ (report_max), then start sending periodic
  Async Event Notification message. The level is Critical
  Warning.
---

When an event is related to a flow control, the notification module 630 may determine whether the slowdown event reaches the threshold level based on a normalized rate ($R_F$) of a host command fetch over a predefined time interval as shown in List 2 below. The normalized rate of a host command fetch represents a ratio of a number of IO commands fetched from the host device over an expected maximum number of IO commands.

---
List 2

The normalized rate of host command fetch $R_F$ over a
predefined time interval T.
  $R_F$ = (Number of IO commands fetched over T) /
  (Expected maximum number of IO commands over T),
  where $0 \leq R_F \leq 1$.
  Expected maximum number of IO commands is a
  predefined value.
  $R_{Fmin}$ (report_min) and $R_{Fmax}$ (report_max) are runtime
  configurable parameters.
  The interval of concern is also configurable as below to
  trigger the event notification or not:
    Interval 1: $R_F \leq R_{Fmin}$ (report_min)
    Interval 2: $R_F$ > $R_{Fmax}$ (report_max)
    Interval 3: $R_{Fmin}$ (report_min) < $R_F \leq R_{Fmax}$
    (report_max)
---

In List 2, information for the normalized rate $R_F$ is useful during intensive workload testing duration, not necessarily during intentional idle duration. Based on the comparison result between the normalized rate $R_F$ and threshold values, the notification interval of the notification module 630 is determined. When the rate $R_F$ is less than a threshold value $R_{Fmin}$ (report_min), the notification module 630 may transmit the notification message within a first interval, i.e., interval 1. When the rate $R_F$ is greater than a threshold value $R_{Fmax}$ (report_max), the notification module 630 may transmit the notification message within a second interval, i.e., interval 2. When the rate $R_F$ is greater than the threshold value $R_{Fmin}$ (report_min) and is equal to or less than threshold value $R_{Fmax}$ (report_max), the notification module 630 may transmit the notification message within a third interval, i.e., interval 3. For example, interval 1 may be the shortest and interval 2 may be the longest, with interval 3 in between.

In various embodiments, the notification module 630 may transmit an asynchronous event notification message in accordance with an asynchronous event notification process as a platform reserved for a vendor's use, which is defined in the NVMe specification. In the NVMe specification, an asynchronous event request command may be usable, which is subject to the vendor specific event. For example, the event type "6 h", "7 h" or "3 h-5 h" reserved types may be usable.

Alternatively, the notification module 630 may transmit an asynchronous event notification message using a vendor unique command, which is set by the vendor. In other words, for any host software tool, a vendor unique command (VUC) may be provided from the SSD (i.e., memory device) to collect such events stored in the SSD.

If it is not determined that the slowdown event occurs, the control component 120 may fetch a next command subsequent to the command from the host device 5.

Figure 7:
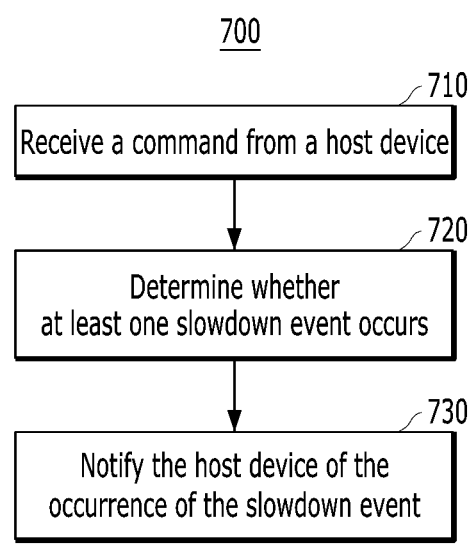
FIG. 7 is a flowchart illustrating an operation for notifying a slowdown status of a memory system in a data processing system in accordance with an embodiment of the present invention.

FIG. 7 is a flowchart illustrating an operation 700 for notifying a slowdown status of a memory system in a data processing system in accordance with an embodiment of the present invention. The operation 700 may be performed by the controller 100 (i.e., the control component 120 of FIG. 6) of the memory system 10.

Referring to FIG. 7, the operation 700 may include receiving (710) a command by a memory device from a host device, determining (720) whether at least one slowdown event occurs due to an internal operation, and if it is determined that the slowdown event occurs, notifying (730) the host device of the occurrence of the slowdown event.

In various embodiments, the internal operation includes one of a garbage collection operation and a wear levelling operation.

In various embodiments, the determining (720) of whether the slowdown event occurs due to the internal operation occurs includes determining whether the slowdown event reaches a threshold level. The slowdown event may include an event related to a quality of service between the host device and the memory system, such as a throughput throttling between the controller and the memory device, and a flow control between the host device and the memory system.

In case that the slowdown event is related to the throughput throttling, the determining of whether the slowdown event reaches the threshold level may be performed based on a resource allocation ratio of a housekeeping workload over a host workload over a predefined time interval.

In case that the slowdown event is related to the flow control, the determining of whether the slowdown event reaches the threshold level may be determined based on comparison with a normalized rate of a host command fetch over a predefined time interval.

In various embodiments, the notifying (730) of the occurrence of the slowdown event of the host device may include, when the slowdown event reaches the threshold level, transmitting, to the host device, an asynchronous event notification message to notify the occurrence of the slowdown event.

If it is determined that there is no slowdown event, fetching a next command subsequent to the command from the host device may be performed.

Figure 8:
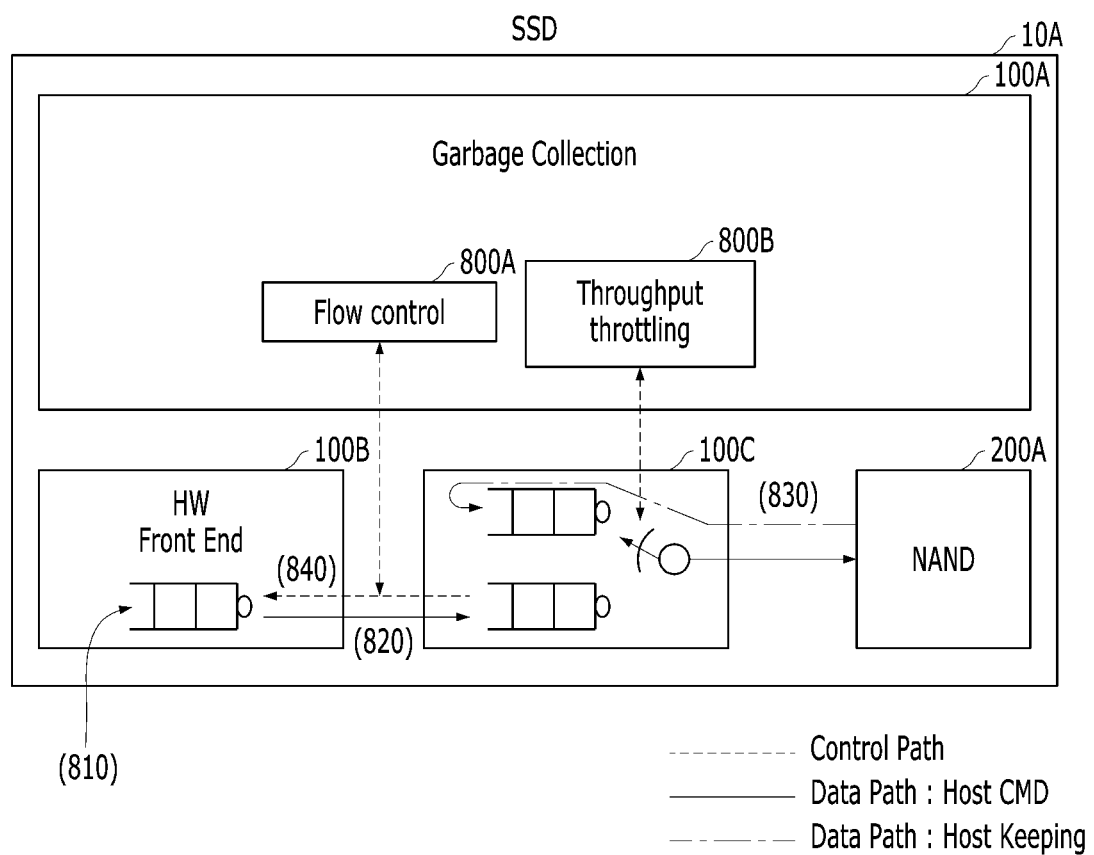
FIGS. 8 and 9 are diagrams illustrating an example of an operation for notifying a slowdown status of a memory system in a data processing system in accordance with an embodiment of the present invention.
Figure 9:
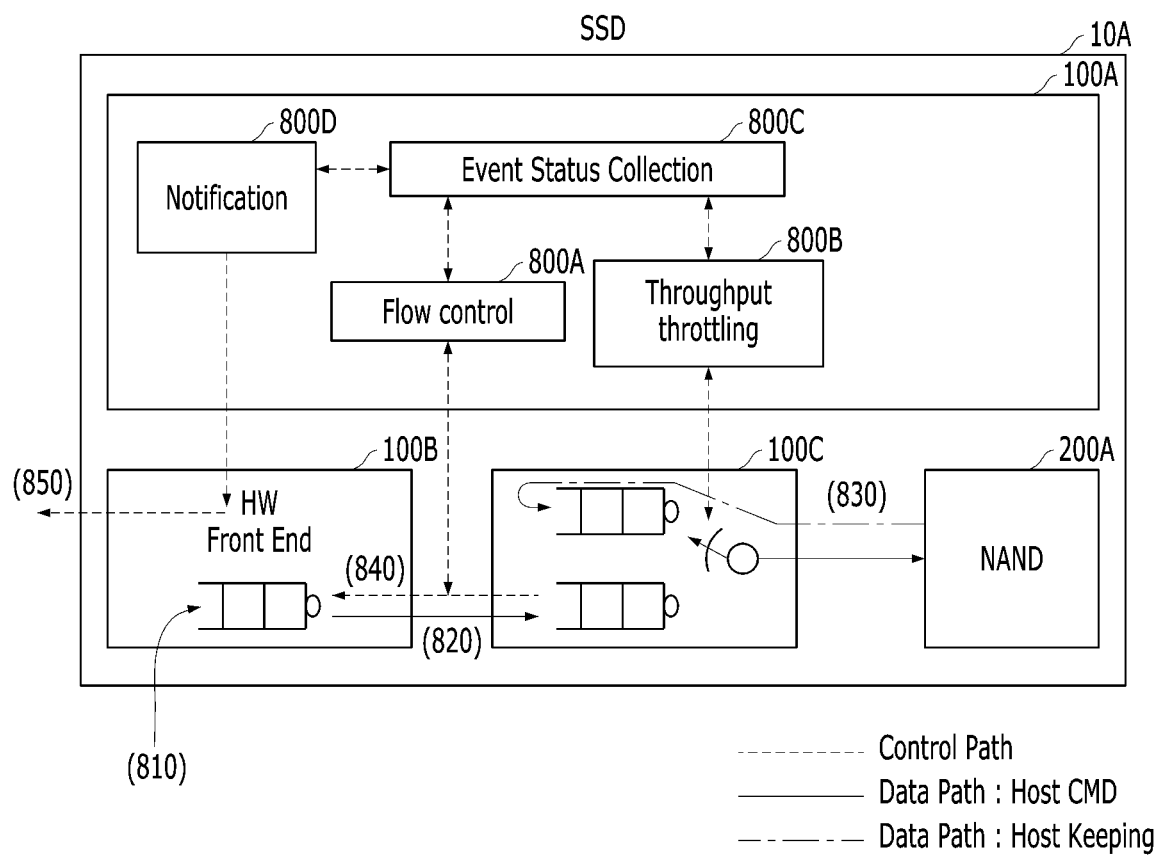

FIGS. 8 and 9 are diagrams illustrating an example of an operation for notifying a slowdown status of a memory system in a data processing system in accordance with an embodiment of the present invention. FIG. 8 illustrates a slowdown status of a memory system (e.g., SSD) 10A due to an internal housekeeping operation, and FIG. 9 illustrates notifying a slowdown status (or event) of the memory system 10A.

In FIGS. 8 and 9, it is assumed that a memory system is implemented with a solid state drive (SSD) 10A. The SSD 10A may include a controller and a NAND media 200A as a memory device. The controller may include a control component 100A, a hardware (HW) front end 100B, and HW resources 100C. The control component 100A may correspond to the control component 120 of FIGS. 1B and 6. The HW front end 100B may correspond to the host interface 140 of FIG. 1B. The HW resources 100C may include queues for receiving and queuing commands. A flow control module 800A and a throughput throttling module 800B may perform housekeeping operations for securing a quality of service between a host device and the memory system, which are performed during an internal operation (e.g., garbage collection) by the operation module 610 of FIG. 6. An event status collection module 800C may correspond to the event status collection module 620 of FIG. 6, and a notification module 800D may correspond to the notification module 630 of FIG. 6.

Referring to FIG. 8, when a command (810) from a host device arrives, the SSD 10A may be busy processing a group of housekeeping commands (830). After receiving the command (820), the SSD 10A cannot fetch an additional command from the host device. In this case, existing commands inside the SSD 10A may experience additional latency until the completion of the received command. The control component 100A may throttle the throughput to the NAND media 200A to secure enough free blocks for future host IO command processing by giving proportional resources to each $_{[C1]}$ of the queues. As a result of the throttle, upon receiving the flow control indication (840), the HW front end 100B may not fetch additional command from the host device.

Referring to FIG. 9, during the housekeeping operation, the host device may experience a lower throughput. Such statistics and status are tracked by the event status collection module 800C. Once the event status reaches the threshold value, the notification module 800D may trigger a notification process to transmit an event notification message (850) indicating the occurrence of the slowdown event to the host device.

At the host device side, upon receiving event notification message, the host device may throttle a generation rate for commands for the memory system. A particular generation rate may be used as performance characterization for any specific workload.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data processing system comprising:
a host device; and
a memory system including a controller and a memory device,
wherein the controller includes an event status collection module configured to collect and categorize events including slowdown events related to an internal operation of the controller, and
wherein the controller is suitable for:
receiving a command for the memory device from the host device;
determining whether at least one slowdown event that occurs due to the internal operation corresponding to the command is related to a first condition or a second condition;
when it is determined that the slowdown event is related to the first condition, determining whether the slowdown event occurred based on a first criterion, and when it is determined that the slowdown event occurred based on the first criterion, determining a status level of the slowdown event;
when it is determined that the slowdown event is related to the second condition, determining whether the slowdown event occurred based on a second criterion, and when it is determined that the slowdown event occurred based on the second criterion, determining one of multiple intervals within which to notify the host device of occurrence of the slowdown event, wherein each of the multiple intervals is associated with a respective one of multiple status levels, and the determined interval corresponds to a status level of the slowdown event; and
transmitting, to the host device, an event notification message indicating occurrence of the slowdown event based on the first criterion and the determined status level or an event notification message indicating occurrence of the slowdown event based on the second criterion within the determined interval,
wherein the first criterion includes a resource allocation ratio of a housekeeping workload to a host workload over a time interval.

2. The data processing system of claim 1, wherein the internal operation includes one of a garbage collection operation and a wear levelling operation.

3. The data processing system of claim 1, wherein the housekeeping workload is related to a quality of service between the host device and the memory system.

4. The data processing system of claim 3, wherein the first condition includes throughput throttling between the controller and the memory device.

5. The data processing system of claim 1, wherein the second criterion includes a normalized rate of a host command fetch over a time interval.

6. The data processing system of claim 5, wherein the second condition includes flow control between the host device and the memory system.

7. The data processing system of claim 6, wherein the controller determines whether the normalized rate reaches a threshold level.

8. The data processing system of claim 1, wherein the controller notifies the host device of the occurrence of the slowdown event by transmitting, to the host device, an event notification message indicating that the determined status level is a normal warning when the resource allocation ratio reaches a first threshold level but is less than a second threshold level, and by transmitting, to the host device, an event notification message indicating that the determined status level is a critical warning when the resource allocation ratio reaches the second threshold level.

9. The data processing system of claim 1, wherein the controller further fetches a next command subsequent to the command from the host device when it is not determined that the slowdown event occurs.

10. A method for operating a data processing system, the method comprising:
receiving a command, by a controller, for a memory device from a host device;
collecting and categorizing events including slowdown events related to an internal operation of the controller, using an event status collection module of the controller;
determining, by the controller, whether at least one slowdown event that occurs due to the internal operation corresponding to the command is related to a first condition or a second condition;
determining, by the controller, whether the slowdown event occurred based on a first criterion, when it is determined that the slowdown event is related to the first condition, and when it is determined that the slowdown event occurred based on the first criterion, determining a status level of the slowdown event;
determining, by the controller, whether the slowdown event occurred based on a second criterion, and when it is determined that the slowdown event occurred based on the second criterion, determining one of multiple intervals within which to notify the host device of occurrence of the slowdown event, when it is determined that the slowdown event is related to the second condition, wherein each of the multiple intervals is associated with a respective one of multiple status levels, and the determined interval corresponds to a status level of the slowdown event; and
transmitting, by the controller, to the host device, an event notification message indicating occurrence of the slowdown event based on the first criterion and the determined status level or an event notification message indicating occurrence of the slowdown event based on the second criterion within the determined interval,
wherein the first criterion includes a resource allocation ratio of a housekeeping workload to a host workload over a time interval.

11. The method of claim 10, wherein the internal operation includes one of a garbage collection operation and a wear levelling operation.

12. The method of claim 10, wherein the housekeeping workload is related to a quality of service between the host device and the memory system.

13. The method of claim 12, wherein the first condition includes a throughput throttling between the controller and the memory device.

14. The method of claim 10, wherein the second criterion includes a normalized rate of a host command fetch over a time interval.

15. The method of claim 14, wherein the second condition includes flow control between the host device and the memory system.

16. The method of claim 15, wherein the determining of whether to notify the host device of occurrence of the slowdown event includes determining whether the normalization rate reaches a threshold level.

17. The method of claim 10, wherein the transmitting to the host device includes notifying the host device of the occurrence of the slowdown event by transmitting, to the host device, an event notification message indicating that the determined status level is a normal warning when the resource allocation ratio reaches a first threshold level but is less than a second threshold level, and by transmitting, to the host device, an event notification message indicating that the determined status level is a critical warning when the resource allocation ratio reaches the second threshold level.

18. The method of claim 10, further comprising:
when it is not determined that the slowdown event occurs, fetching a next command subsequent to the command from the host device.

* * * * *